US008118680B2

(12) United States Patent
Layne, IV et al.

(10) Patent No.: US 8,118,680 B2
(45) Date of Patent: Feb. 21, 2012

(54) MULTI-TOUCHSCREEN MODULE FOR AMUSEMENT DEVICE

(75) Inventors: William L Layne, IV, Langhorne, PA (US); Colin Higbie, Middletown, VA (US)

(73) Assignee: AMI Entertainment Network, Inc., Bristol, PA (US)

( * ) Notice: Subject to any disclaimer, the term of this patent is extended or adjusted under 35 U.S.C. 154(b) by 0 days.

(21) Appl. No.: 12/940,527

(22) Filed: Nov. 5, 2010

(65) Prior Publication Data

US 2011/0172012 A1 Jul. 14, 2011

Related U.S. Application Data (60) Provisional application No. 61/293,429, filed on Jan. 8, 2010.

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/43; 463/9; 463/16; 463/42; 463/25; 463/31; 473/9

(58) Field of Classification Search ........................ None
See application file for complete search history.

(56) References Cited

U.S. PATENT DOCUMENTS

| | | | | |
|---|---|---|---|---|
| 4,856,787 A | * | 8/1989 | Itkis ............................... | 273/237 |
| 5,711,715 A | * | 1/1998 | Ringo et al. ...................... | 473/9 |
| 5,882,258 A | * | 3/1999 | Kelly et al. ...................... | 463/11 |
| 6,015,344 A | * | 1/2000 | Kelly et al. ...................... | 463/16 |
| 6,077,162 A | * | 6/2000 | Weiss .............................. | 463/26 |
| 6,142,872 A | * | 11/2000 | Walker et al. .................... | 463/16 |
| 6,206,782 B1 | * | 3/2001 | Walker et al. .................... | 463/25 |
| 6,287,197 B1 | | 9/2001 | Dickinson et al. | |
| 6,860,810 B2 | | 3/2005 | Cannon et al. | |
| 7,097,559 B2 | * | 8/2006 | Okita et al. ...................... | 463/11 |
| 7,254,775 B2 | | 8/2007 | Geaghan et al. | |
| 7,689,302 B2 | * | 3/2010 | Schlottmann et al. .......... | 700/91 |
| 7,806,764 B2 | | 10/2010 | Brosnan et al. | |
| 7,841,938 B2 | * | 11/2010 | Gatto et al. ...................... | 463/25 |
| 7,862,427 B2 | | 1/2011 | Nguyen et al. | |
| 2002/0183105 A1 | * | 12/2002 | Cannon et al. .................. | 463/16 |
| 2004/0043815 A1 | * | 3/2004 | Kaminkow ...................... | 463/25 |
| 2004/0070625 A1 | | 4/2004 | Palombo et al. | |
| 2005/0014554 A1 | * | 1/2005 | Walker et al. .................... | 463/20 |
| 2005/0043094 A1 | * | 2/2005 | Nguyen et al. .................. | 463/42 |

(Continued)

OTHER PUBLICATIONS

International Search Report and Written Opinion issued on Apr. 6, 2011 in International Application No. PCT/US2011/020646.

*Primary Examiner* — Paul A. D'Agostino
(74) *Attorney, Agent, or Firm* — Panitch Schwarze Belisario & Nadel LLP (57) ABSTRACT

An amusement device includes a display screen having a touchscreen. The touchscreen is configured to receive a plurality of touch inputs simultaneously. A memory stores a plurality of electronic games for selection and play. A controller is configured to execute an application program. The application program is configured to access a first game and a second game from the plurality of electronic games, and generally simultaneously display at least one first image from the first game on a first portion of the display screen and display at least one second image from the second game on a second portion of the display screen.

11 Claims, 5 Drawing Sheets

U.S. PATENT DOCUMENTS

| | | |
|---|---|---|
| 2005/0059484 A1 | 3/2005 | Logan et al. |
| 2005/0148392 A1 | 7/2005 | Martinez et al. |
| 2006/0073891 A1 | 4/2006 | Holt |
| 2006/0079322 A1 | 4/2006 | Itskov et al. |
| 2006/0183545 A1 | 8/2006 | Jourdian et al. |
| 2007/0026936 A1* | 2/2007 | Gatto et al. .................. 463/25 |
| 2007/0054729 A1* | 3/2007 | Hornik et al. .................. 463/16 |
| 2007/0279394 A1 | 12/2007 | Lampell et al. |
| 2007/0281285 A1* | 12/2007 | Jayaweera .................. 434/156 |
| 2008/0004101 A1* | 1/2008 | Hein et al. .................. 463/20 |
| 2008/0020825 A1* | 1/2008 | Cuddy et al. .................. 463/25 |
| 2008/0132333 A1 | 6/2008 | Kogo |
| 2008/0143722 A1 | 6/2008 | Pagan |
| 2008/0242407 A1 | 10/2008 | Itskov et al. |
| 2009/0075726 A1 | 3/2009 | Stelzer et al. |
| 2009/0085877 A1 | 4/2009 | Chang et al. |
| 2009/0093306 A1 | 4/2009 | Muir et al. |
| 2009/0106667 A1 | 4/2009 | Lyle et al. |
| 2009/0197659 A1 | 8/2009 | Christensen |
| 2009/0197665 A1 | 8/2009 | Christensen |
| 2009/0227369 A1 | 9/2009 | Higbie et al. |
| 2009/0325686 A1 | 12/2009 | Davis et al. |
| 2010/0099491 A1 | 4/2010 | Little et al. |
| 2010/0113141 A1 | 5/2010 | Logan et al. |
| 2010/0130280 A1 | 5/2010 | Arezina et al. |
| 2010/0255900 A1 | 10/2010 | Ansari et al. |
| 2010/0304860 A1 | 12/2010 | Gault et al. |

* cited by examiner

MULTI-TOUCHSCREEN MODULE FOR AMUSEMENT DEVICE

CROSS-REFERENCE TO RELATED APPLICATIONS

This application claims the benefit of U.S. Provisional Patent Application No. 61/293,429, filed on Jan. 8, 2010, entitled "Multi-Touchscreen Module for Amusement Device."

BACKGROUND OF THE INVENTION

An embodiment of the present invention relates generally to an amusement device, and more particularly, to an amusement device with a touchscreen configured to accept, generally simultaneously, a plurality of touch inputs.

Amusement devices having electronic games for computers and touchscreens or other types of amusement devices are generally well known in the art. Amusement devices, such as game machines, which allow a user to select games from a video display are well known in the art, such as those disclosed in U.S. Pat. Nos. 4,856,787 ("Itkis"); 5,575,717 ("Houriet, Jr., et al."); and 5,743,799 ("Houriet, Jr., et al."), the entire contents which are incorporated herein by reference and each of which shows a touchscreen for making a game selection from a menu of games. Such game machines or amusement devices typically operate upon input of currency (i.e., coin, token, paper money, credit/debit cards or the like) and are installed in locations such as bars, restaurants, airports, shopping malls, video arcades, casinos or the like. The game choices may include card games, sports games, games of skill, games of chance, action games, trivia games, or the like.

Generally prior art games with touchscreen displays allow for only one touch input at a time. Thus, prior art devices do not allow for simultaneous multi-player functionality. Players must alternate turns in order to compete or play a game cooperatively. Further, many games are designed for single players only.

It is therefore desirable to provide an amusement device that is configured to enable simultaneous multi-player functionality. It is further desirable to provide such a device that is capable of allowing multi-player functionality using single player games while minimizing the need to alter programming code.

BRIEF SUMMARY OF THE INVENTION

Briefly stated, an embodiment of the present invention is directed to an amusement device including a display screen having a touchscreen. The touchscreen is configured to receive a plurality of touch inputs simultaneously. A memory stores a plurality of electronic games for selection and play. A controller is configured to execute an application program. The application program is configured to access a first game and a second game from the plurality of electronic games. The application program is further configured to generally simultaneously display at least one first image from the first game on a first portion of the display screen and display at least one second image from the second game on a second portion of the display screen.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Certain terminology is used in the following description for convenience only and is not limiting. The words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Figure 1A:
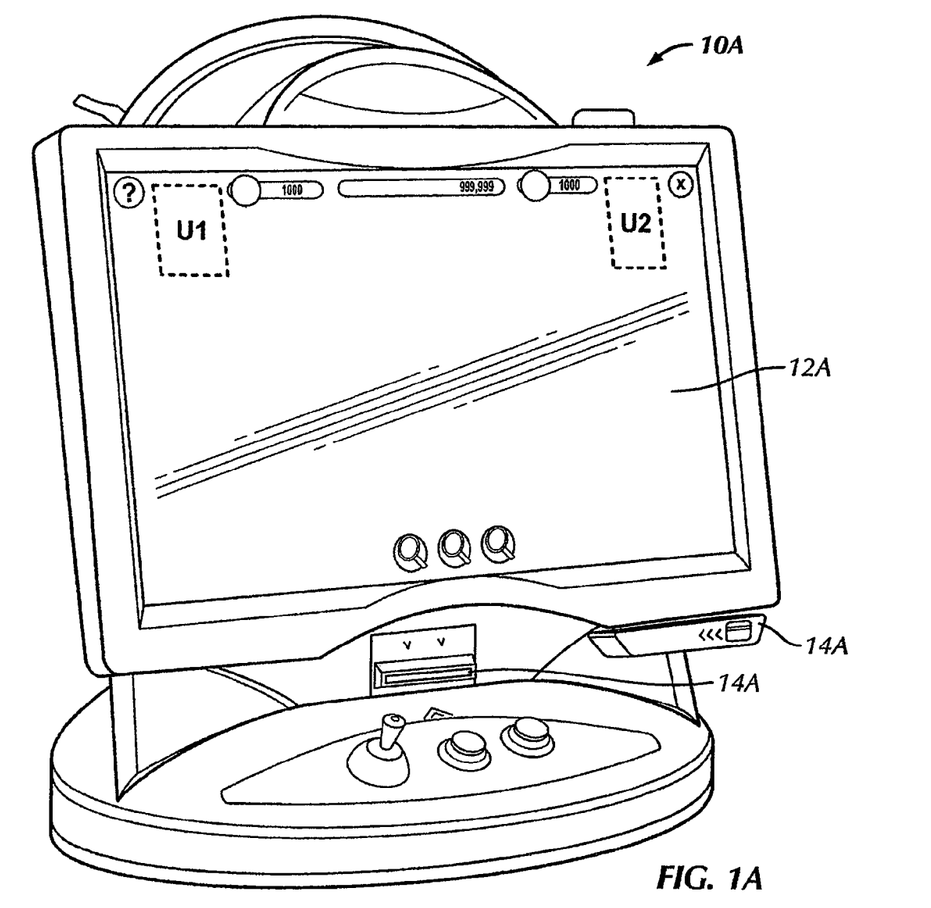
FIG. 1A is a perspective view of an amusement device in accordance with a first preferred embodiment of the present invention.

Referring to the drawings in detail, wherein like reference numerals indicate like elements throughout, there is shown in FIG. 1A a first preferred embodiment of an amusement device 10A. The amusement device 10A includes a controller U1 and a memory U2. The controller U1 may be a single microprocessor, multiple processors, or the like. The memory U2 can be any known or suitable memory device such as random access memory (RAM), read only memory (ROM), flash RAM, hard disk, optical disk, or the like. The amusement device 10A further includes a video display 12A that is operatively connected to the controller U1. The amusement device 10A also includes at least one input component 14A that receives value in order to establish one or more playable credits. The value received may be at least one of currency, coins, tokens, chits, credits, credit cards/debit cards or the like. Although only one input component 14A is shown, the amusement device 10A may include more than one input component 14A to give a user an option for payment, for permitting multiple players, or the like. Preferably, the amusement device 10A is made operable upon actuation of the input component 14A, for example, the user may only select and play an electronic game once value is received at the input component 14A and/or one or more playable credits are issued to the user. However, free selections may be offered at the discretion of an operator of the amusement device 10A.

Figure 1B:
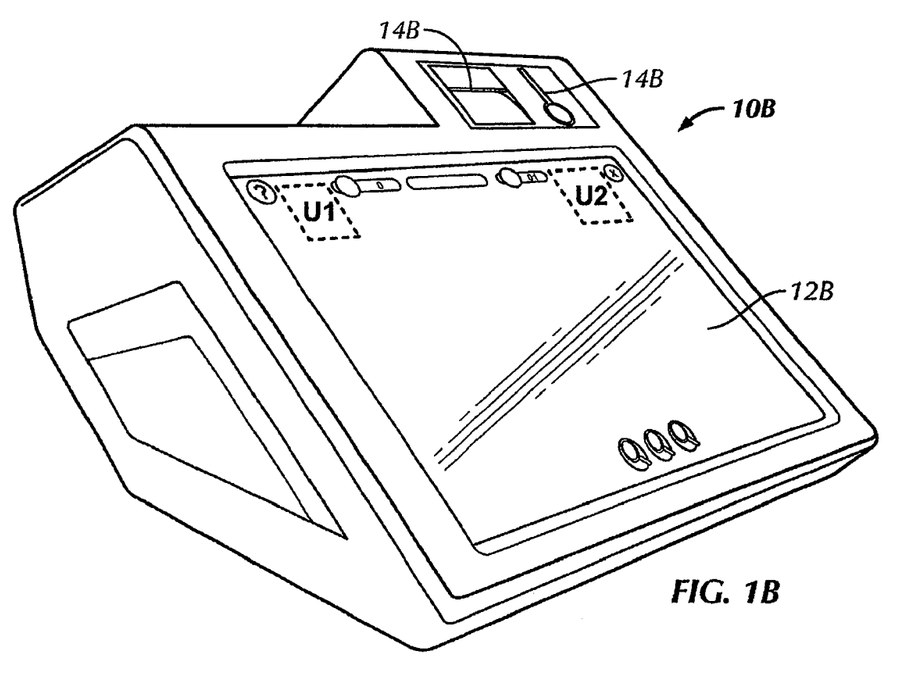
FIG. 1B is a perspective view of an amusement device in accordance with a second preferred embodiment of the present invention.

FIG. 1B shows another or second amusement device 10B in accordance with a second preferred embodiment of the present invention. The second amusement device 10B also includes a controller U1, a memory U2, a display 12B, and an input component 14B. Preferably, the video displays 12A, 12B are touchscreen video displays configured to accept touch input. The first amusement device 10A is a free-standing or floor-standing apparatus, whereas the second amusement device 10B is a table-top or counter-top apparatus.

However, the amusement devices 10A, 10B may be arranged in any configuration including table mount, wall mount, pole mount, and the like without departing from the invention.

For convenience, the amusement devices 10A, 10B will be referred to hereinafter simply as "amusement device 10."

Turning now to the operation of the amusement device 10, the memory U2 stores one or more applications or application programs, such as electronic games, a music or video jukebox program, or the like, and a system control program. However, the one or more application programs may also be stored remotely. Preferably, the memory U2 stores a plurality of electronic games that may be selected and played by one or more players. The controller U1 controls the touchscreen display 12 based upon the system control program retrieved from the memory U2 and based upon inputs from the touchscreen display 12. As used herein, the system control program refers to all of the software that functions outside of the application program files including an operating system, display control, input control, sound drivers, and the like. Other input devices which may be connected to the amusement device 10 include a pushbutton(s), a trackball or touchpad, a mouse, a joy-stick, a foot-pedal, a voice recognition system, a keypad or keyboard, and the like. But, preferably, the input device is the touchscreen display 12.

The amusement device 10 includes an operating mode and a setup mode. When the operating mode is selected, a player or user is selectively permitted to access the application programs. When the setup mode is selected, the owner/operator is permitted to make system setup adjustments. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 10. In the setup mode, the owner/operator may also make adjustments to the game features as will be described in greater detail hereinafter.

In the preferred embodiments of the present invention, the controller U1 controls the display 12 based upon the system control program retrieved from the memory U2 and based upon inputs of the user. The display 12 preferably has a "widescreen" aspect ratio. Such ratios may include, for example, 16:9, 16:10, 1.85:1, 2.35:1, or the like. The touchscreen display 12 is also preferably configured to receive a plurality of touch inputs simultaneously, i.e., one or more users may touch the display 12 in multiple locations simultaneously and have the data associated with each of the touches be accepted. The touchscreen display 12 is therefore of the projected capacitive type, infrared, ultrasonic, or the like for supporting multi-touch input.

Figure 2:
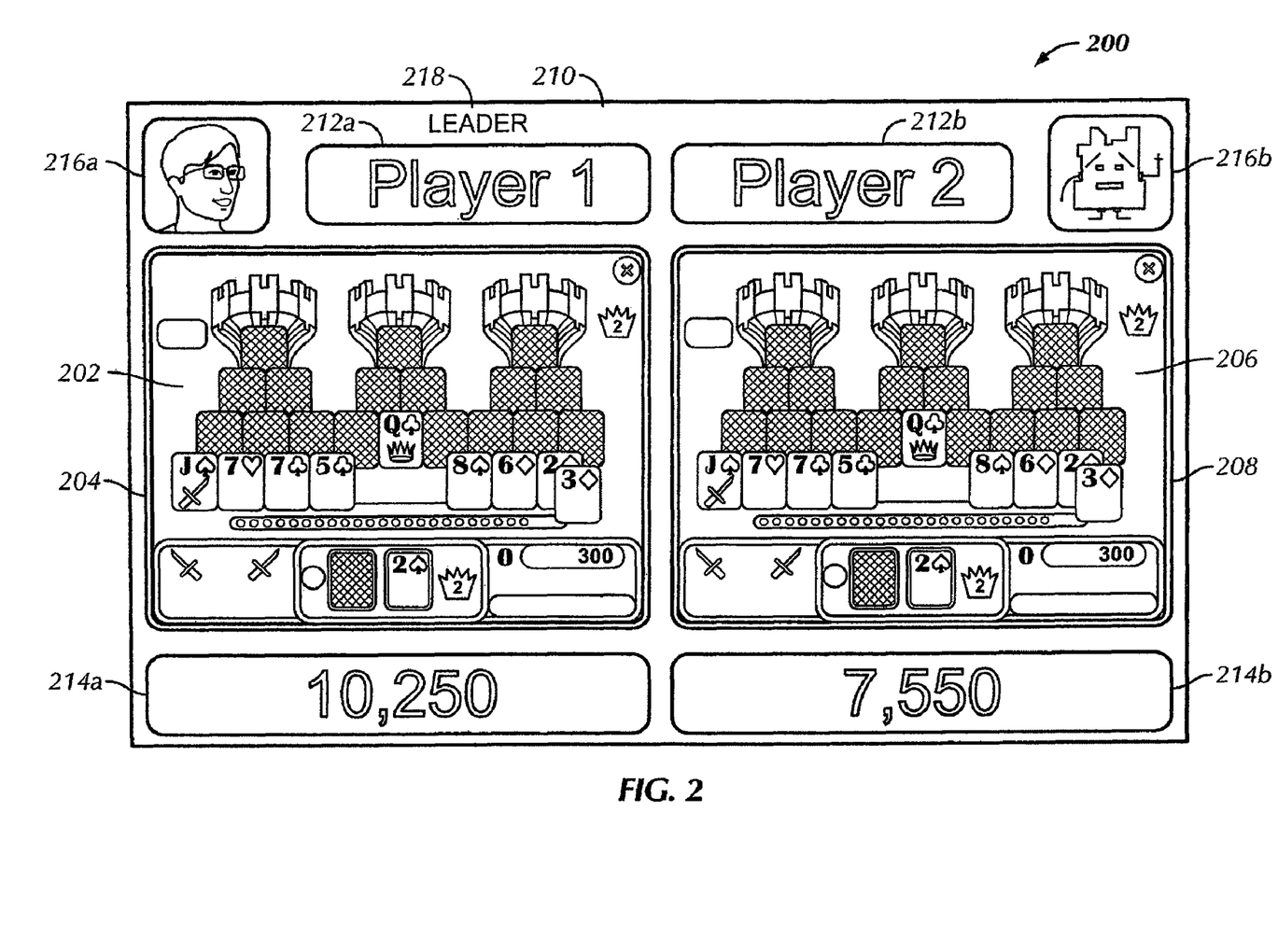
FIG. 2 is a screenshot from an amusement device in accordance with a third preferred embodiment of the present invention.

FIG. 2 is a screenshot 200 from an amusement device 10 in accordance with a preferred embodiment of the present invention. The controller U1 is configured to simultaneously or generally simultaneously execute a first game and a second game from the plurality of electronic games stored in the memory U2. By the term "generally simultaneously," it will be understood that the controller is configured to execute the first game and the second game at the same time, with no humanly perceptible delay occurring between the execution of the first game and the execution of the second game. However, one skilled in the art would understand that a brief humanly perceptible delay may occur between the execution of the first game and the execution of the second game, as long as the first and second games may effectively be played simultaneously.

The first game is configured to display at least one image 202 on a first portion 204 of the display screen 12. The second game is configured to display at least one image 206 on a second portion 208 of the display screen 12. The first and second games are, in one embodiment, preferably the same game selected from the plurality of electronic games, thus permitting multiple users to compete or play cooperatively. However, the first and second games may also be different games, enabling competitive or cooperative play between games. Although two games are shown in FIG. 2 as being executed and playable simultaneously, any number of games may be executed and playable by the controller U1, dependent mostly upon the size of the display screen 12.

For example, the first game is playable by the first player 212a to attain a first score 214a, and the second game is playable by the second player 212b to attain a second score 214b. The controller U1 may be configured to compare the first score 214a and the second score 214b to, for example, determine a winner 218 between the first and second players 212a, 212b. In cooperative play, the controller U1 may be configured to store one of the first and second scores 214a, 214b as a best cooperative score (e.g., lowest score for golf or highest score for bowling, or the like). Alternatively, the first and second scores 214a, 214b may be summed by the controller U1 and stored as a cumulative cooperative score.

The selected game may include a plurality of play scenarios. Thus, where the first and second game are the same, the first game may present a first, one of the plurality of play scenarios to the first player 212a, and the second game may present a second one of the plurality of play scenarios to the second player 212b. For competitive or cooperative play, the first and second games will preferably present the same play scenario to both players 212a, 212b. For example, the plurality of play scenarios for a game of solitaire are the plurality of possible deals or "hands" that a player may be presented with. Some hands of solitaire inherently cannot be taken to completion, no matter how skilled the player. A competitive game of solitaire, where the first player 212a receives a completable hand and the second player 212b does not, presents an unfair advantage to the first player 212a because the second player 212b can never achieve the highest possible score achievable by the first player 212a. Thus, presenting the same hand to both players 212a, 212b levels the playing field.

In one embodiment, the controller U1 is configured to execute an application program that is configured to access the first and second games from the plurality of electronic games stored in the memory U2. The application program is also configured to simultaneously or generally simultaneously display the at least one first image 202 on the first portion 204 of the display screen 12 and the at least one second image 206 on the second portion 208 of the display screen 12. By the term "generally simultaneously," it will be understood that the application program is configured to display the first image 202 and the second image at the same time, with no humanly perceptible delay occurring between displaying of the first image and displaying of the second image. However, one skilled in the art would understand that a brief humanly perceptible delay may occur between displaying of the first image and displaying of the second image, as long as the first and second games may effectively be played simultaneously.

The application program may be a software module, or the like, which operates as a shell to execute the first and second games. Accordingly, single player games or games that do not support, simultaneous multi-player functionality may be run in the shell for simultaneous competitive or cooperative play with minimal or no changes required to the game code itself.

In order to facilitate competitive or cooperative play, the application program is configured to retrieve data from at least one of the first and second games and display the retrieved data on a third portion 210 of the display screen 12. The retrieved data may be, for example, player names 212a, 212b, player scores 214a, 214b, avatars 216a, 216b, time remaining (not shown), or the like. In competitive play, for example, the application program can use and compare the scores 214a, 214b retrieved from the first and second games to determine a winner 218 among the players. Specifically, the retrieved data may include the first score 214a attained by the first player 212a of the first game and the second score 214b attained by the second player 212b of the second game, and the application program may compare the first and second scores 214a, 214b to determine a winning score based on the retrieved first and second player scores 214a, 214b. Similarly, in cooperative play, for example, the application program can use the scores 214a, 214b retrieved from the first and second games and calculate and store a sum of the first and second scores.

Figure 3:
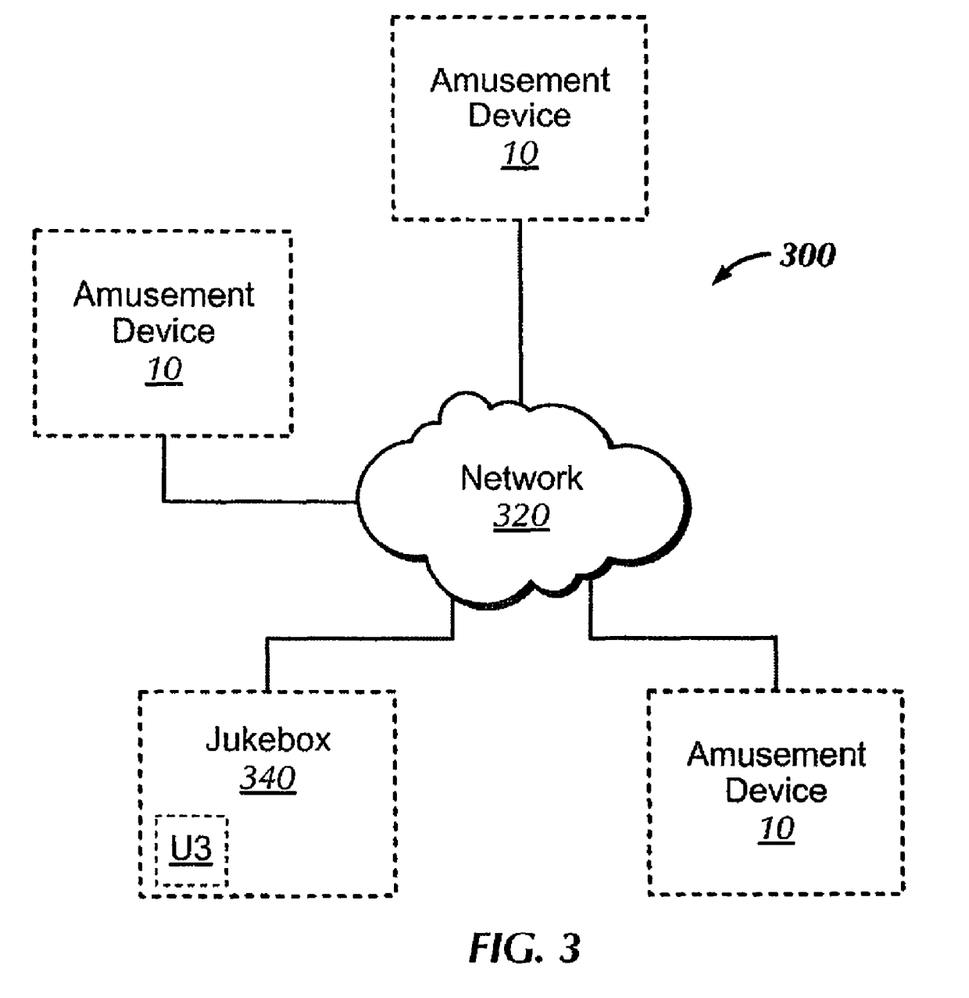
FIG. 3 is a schematic block diagram of an amusement device network in accordance with a fourth embodiment of the present invention.

Referring to FIG. 3, in another embodiment, the amusement device 10 may be a part of a tournament system 300 having a plurality of amusement devices 10. The tournament system 300 includes a plurality of tournament games playable by a plurality of players. Each tournament game generates a total player score upon completion of play. The player scores are used to determine tournament winners. The tournament games may be stored in the memory U2 of the amusement device 10, or may be available for download or on-line play over a network 320.

Accordingly, two players may simultaneously use the amusement device 10 to compete in a tournament. At least one of the first score 214a and the second score 214b may be stored for entry into the tournament, particularly during competitive play between the players. For example, the controller U1 may only accept the score of the winner 218. In cooperative play, the best score between the first and second players may be selected and stored by the controller U1 for entry into the tournament as a cooperative score. Alternatively, a sum of the first and second scores 214a, 214b may be entered into the tournament as a cooperative score among the players.

Figure 4:
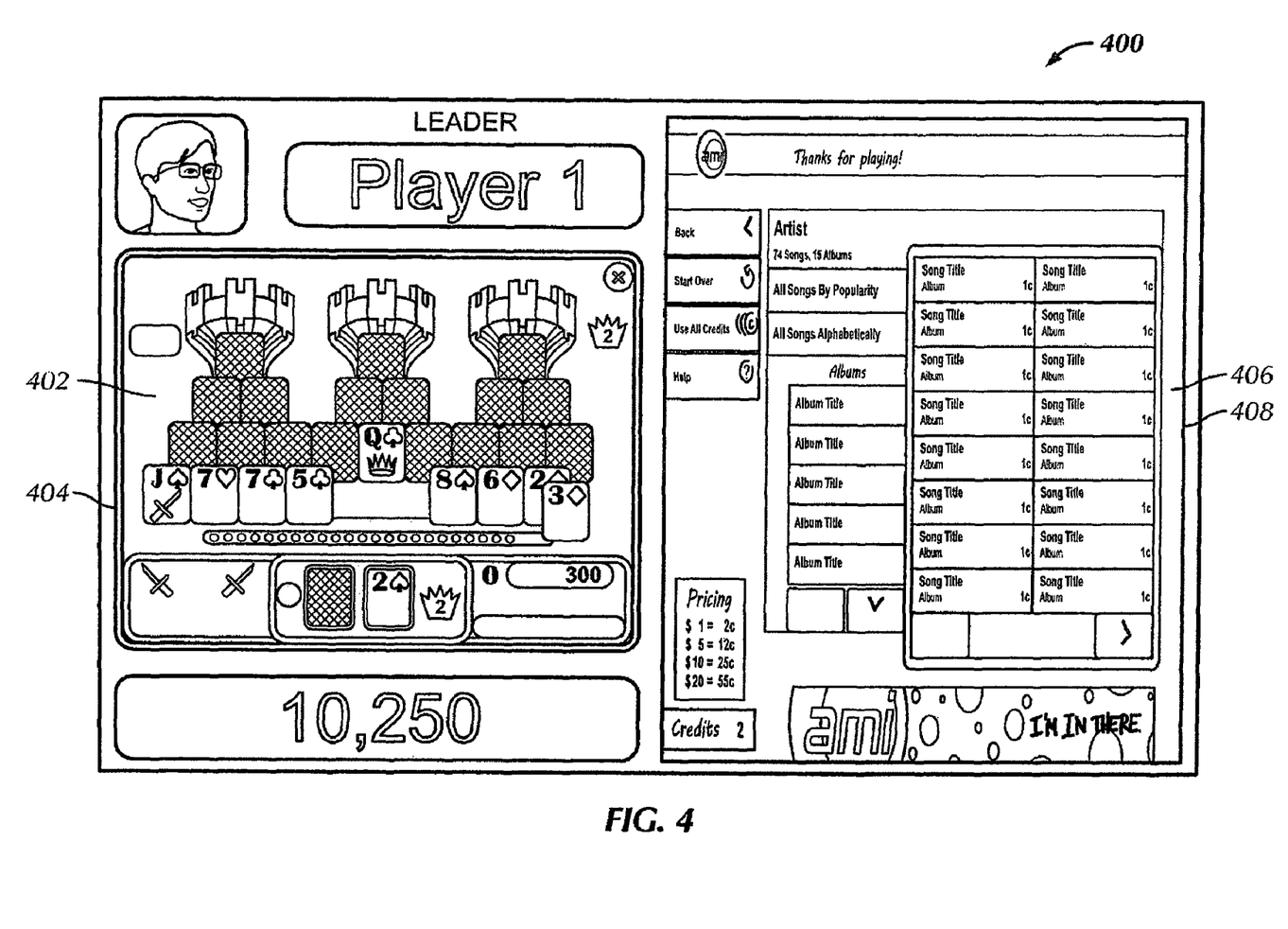
FIG. 4 is a screenshot from an amusement device in accordance with the fourth preferred embodiment of the present invention.

Embodiments of the present invention are also directed to applications other than simultaneous execution of games. For example, FIG. 4 is a screenshot 400 from an amusement device in accordance with another preferred embodiment. An application program executed by the controller U1 is configured to access a first game from the plurality of games stored in memory U2, and access a jukebox controller U3 (as shown in FIG. 3). Alternatively, the jukebox controller U3 may access the controller U1 to run the application program. The jukebox controller U3 is configured to select and play at least one, music data set. A music data set preferably includes at least audio data required for playing a song or other audio presentation, and can be an .mp3, .wma, .wav file, or the like. Accordingly, a music data set may also include metadata, i.e., information about the song such as artist, title, album, run time, or the like. A music data set may also be a video file, such as an .mpeg, .wmv, .avi, .mov file, or the like, and thus includes at least video data required for playing a video.

Referring to FIG. 4, as described above, the application program displays at least one first image 402 from the first game on a first portion 404 of the display screen 12. Generally simultaneously, the application program displays at least one second image 406 representing a jukebox control interface (for allowing player interaction with the jukebox controller U3) on a second portion 408 of the display screen 12. A player (or players) can thus generally simultaneously apply multiple touch inputs to play a game and select and play music or videos.

The jukebox controller U3 is shown in FIG. 3 as being located remotely from the amusement device 10. Specifically, the jukebox controller U3 may be located within a stand-alone jukebox 340 that outputs its own audio or video, wherein the amusement device 10 is connected to the jukebox 340 over the network 320 or locally (not shown). The jukebox controller U3 may also be within a server (not shown) that provides audio or video data to the amusement device 10 to broadcast through the audio and/or video output components of the amusement device 10. Alternatively, the jukebox controller U3 may also be located at the amusement device 10. It is also contemplated that the controller U1 of the amusement device can also function as the jukebox controller U3.

As described above, it is further contemplated that more than one game may be simultaneously executed and played along with the jukebox control interface. Further, an application program is not necessarily required by the controller U1 to perform the simultaneous display of the first game and the jukebox control interface. For example, the controller U1 may be capable of executing the first game and the jukebox controls generally simultaneously.

The amusement device 10 may also include other functionality and features such as music jukebox, video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other amusement devices, and the like.

The amusement device 10 may also provide for remote or local access for accounting and/or bookkeeping purposes. The amusement device 10 may include a local connector for uploading to a hand-held or portable computer or removable memory for receiving accounting or other data. The amusement device 10 may include accounting and bookkeeping screens accessible by an operator through set up screens and/or through password protection.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An amusement device comprising:
    (a) a display screen having a touchscreen, the touchscreen being configured to receive a plurality of touch inputs simultaneously;
    (b) a memory that stores a plurality of electronic games for selection and play; and
    (c) a controller configured to execute an application program, the application program being configured to operate as a shell and configured to:
        (i) execute a first game and a second game from the plurality of electronic games, the first and second games being one of single player games and games that do not support simultaneous multi-player functionality, and
        (ii) generally simultaneously display at least one first image from the first game on a first portion of the display screen and display at least one second image from the second game on a second portion of the display screen, wherein the application program is further configured to retrieve data from at least one of the first and second games and display the retrieved data on a third portion of the display screen.

2. The amusement device of claim 1, wherein the first game and the second game are the same game selected and executed from the plurality of electronic games.

3. The amusement device of claim 2, wherein the executed game is configured to be played by a single player.

4. The amusement device of claim 2, wherein the selected game includes a plurality of play scenarios.

5. The amusement device of claim 3, wherein the first game is playable by a first player to attain a first score, and the second game is playable by a second player to attain a second score.

6. The amusement device of claim 5, wherein the application program is further configured to compare the first score with the second score.

7. The amusement device of claim 5, wherein the application program is further configured to calculate and store a total sum of the first score and the second score.

8. The amusement device of claim 4, wherein the first game presents a first one of the plurality of play scenarios, and the second game presents a second one of the plurality of play scenarios.

9. The amusement device of claim 4, wherein the first game and the second game present the same play scenario selected from the plurality of play scenarios.

10. The amusement device of claim 1, wherein the retrieved data includes at least one of a player name, player score, avatar, or time remaining.

11. The amusement device of claim 10, wherein the retrieved data includes a first score attained by a first player of the first game and a second score attained by a second player of the second game, and the application program is configured to determine a winning score based on the retrieved first and second player scores.

* * * * *